UNITED STATES PATENT OFFICE.

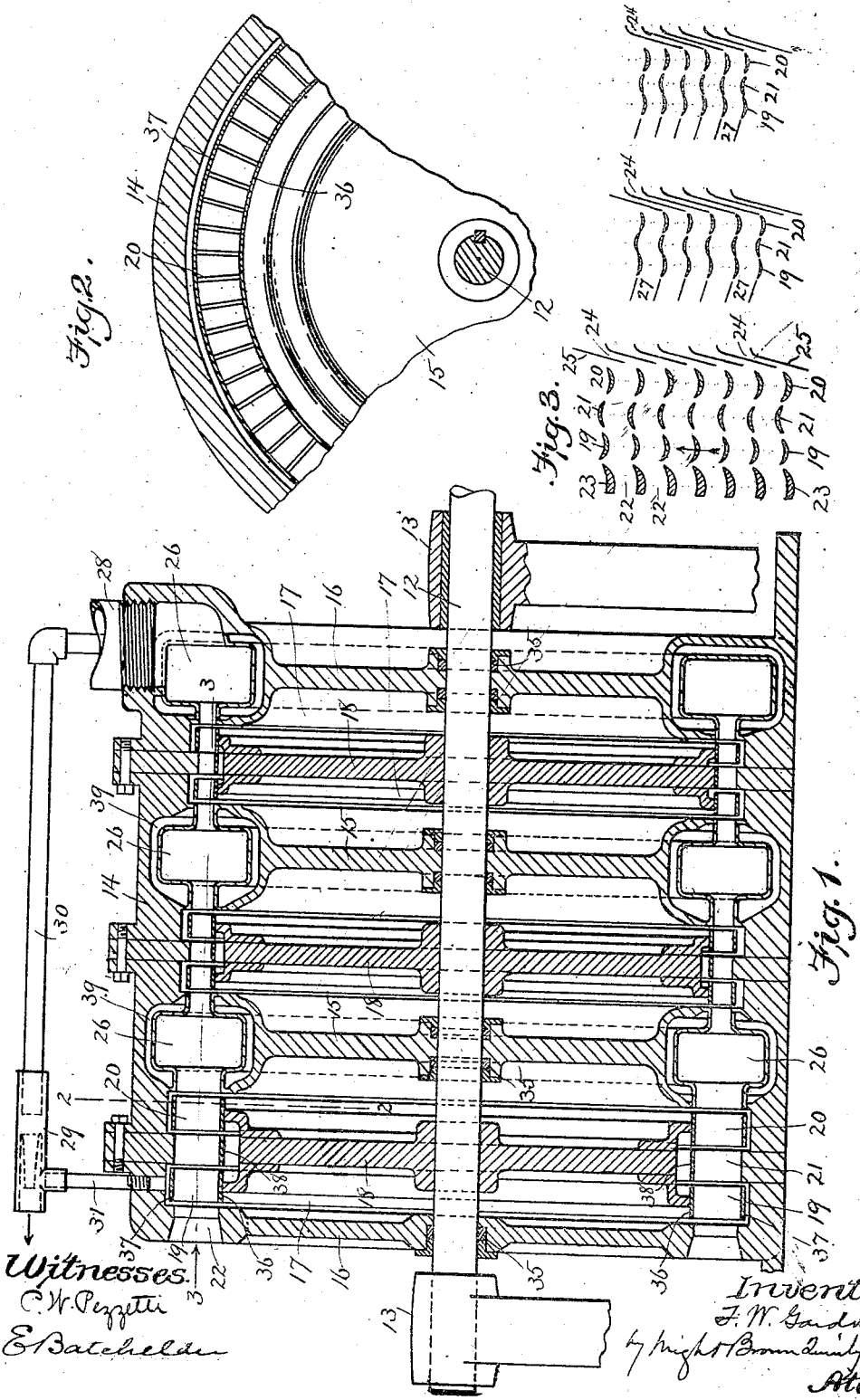

FREDERICK W. GARDNER, OF NEW LONDON, NEW HAMPSHIRE.

AIR-COMPRESSOR.

936,114.   Specification of Letters Patent.   Patented Oct. 5, 1909.

Application filed August 13, 1906. Serial No. 330,308.

*To all whom it may concern:*

Be it known that I, FREDERICK W. GARDNER, of New London, in the county of Merrimack and State of New Hampshire, have invented certain new and useful Improvements in Air-Compressors, of which the following is a specification.

This invention has for its object to provide an air compressor, the principle of which is, to a certain extent, that of the steam turbine reversed. In the steam turbine, the steam is allowed to expand in a nozzle which is so shaped that the steam issues from it at a high velocity, which represents the energy which disappears during its expansion. The steam jet then strikes the buckets of the wheel of the turbine, or passes through or over several wheels, imparting its velocity to the wheel or wheels, and then passes out of the apparatus after having parted with all its available energy.

My invention is embodied in a turbine compressor, in which the air is given a high velocity by passing over a series of moving and stationary buckets, and then still at its original pressure, discharged into a passage which corresponds to the expansion nozzle of the steam turbine, where its motion is retarded, the air current losing most of its velocity, and becoming correspondingly compressed. This operation is repeated until the air reaches the required pressure, the density of the air progressively increasing.

My invention consists in the several improvements which I will now proceed to describe and claim.

Of the accompanying drawings, forming a part of this specification, Figure 1 represents a sectional elevation of an air compressor embodying my invention. Fig. 2 represents a fragmentary section taken on the plane of line 2—2 of Fig. 1. Fig. 3 represents diagrammatically a section on line 3—3 of Fig. 1.

The same numerals of reference indicate the same parts in all the figures.

In the embodiment of my invention here shown for purposes of illustration, 12 represents a shaft journaled in suitable bearings 13, and rotated by power applied in any suitable way. 14 represents a fixed casing, which surrounds the shaft between the bearings 13, and is subdivided by partitions or diaphragms 15, into a series of cylindrical compartments 17, the outer sides of the end compartments of the series being formed by end pieces or heads 16, corresponding in form to the diaphragms 15. Located within the compartments 17 and affixed rigidly to the shaft so as to be rotated thereby, are a series of wheels 18, each of which carries on its perimeter two series of buckets 19 and 20. The said buckets are preferably crescent shaped in cross section, as shown in Fig. 3, although they may be of any other suitable form. Between the buckets 19 and 20 of each wheel are interposed fixed buckets 21, which are also preferably crescent shaped in cross section, the said buckets 21 being affixed to the casing and projecting inwardly therefrom between the buckets 19 and 20. The curvature of the buckets 21 is the reverse of that of the buckets 19 and 20, the concave faces of the buckets 21 facing in the opposite direction from the concave faces of the buckets 19 and 20. One of the casing heads 16 is provided with a concentric series of inlet nozzles 22, the sides of which are formed by radial partitions 23, which are curved or inclined so as to give each nozzle 22 a decided slant or obliquity relatively to the axial line of the shaft 12, as indicated in Fig. 3. The air to be compressed is drawn from the outside atmosphere through the nozzles 22, and compressed by the coöperation of the buckets 19, 20 and 21 and their accessories, as hereinafter described. At the outlet side of each series of buckets 20 is a series of outlet nozzles 24, affixed to the casing. Said nozzles are preferably formed by a plurality of thin radially arranged blades 25 secured in any suitable manner to the casing and arranged to conform to the angle at which the air currents are delivered by the buckets 20, the velocity of the said currents being decreased, and the density or compression of said currents correspondingly increased by the pressure existing in annular chambers 26, said chambers removing the air currents from the moving buckets 20. Pressure is accumulated in the chambers 26, and resists the movement of air through the nozzles 24, which are therefore compression nozzles.

The compression nozzles 24 discharge the air currents into the annular chambers 26, one side of each chamber communicating with the compression nozzles 24, while the opposite side communicates with nozzles 27 formed by thin blades affixed to the casing, and having a slight inclination relatively to the axis of the shaft 12, as indicated in Fig. 3. The nozzles 27 deliver the air currents to the buckets 19, 20 and 21 in the next compartment. Each compartment 17, the moving and fixed blades therein, and the compression nozzles thereof, constitute a section or stage of the compressor, the said sections being alike in construction, so that the description of one applies to all, the only difference between the different sections being that the proportions of the buckets and of the blades forming the inlet and compression nozzles, and the width of the spaces between the buckets, preferably decrease from section to section from the receiving to the delivering end of the compressor, as indicated diagrammatically in Fig. 3. From the last chamber 26 of the series extends a discharge passage 28 for the air as finally compressed.

29 represents an ejector, which is connected by a pipe 30 with the outlet passage 28, and by a pipe 31 with the chamber or compartment 17, at the inlet end of the casing. A small portion of the compressed air passing out through the passage 28, passes through the pipe 30 and ejector 29, and induces an outward flow of air through the pipe 31 from the first chamber or compartment 17, for a purpose hereinafter described.

The operation of the described apparatus is as follows: The inlet nozzles 22 have, as already stated, a considerable slant or inclination at their inner ends, and as the moving buckets 23 revolve in the direction indicated by the arrow in Fig. 3, they tend to pull or suck the air inwardly through the said inlet nozzles. This sucking action, due to the slant of the inlet nozzles 22, is not strong enough to provide the apparatus with all the air required, but is sufficient, in starting the operation, to produce a slight pressure in the chamber 26 at the outlet end of the apparatus, this pressure being sufficient to cause the ejector 29 to draw air out of the compartment 17 of the first section of the apparatus. The partial vacuum or rarefication thus produced, causes air to rush in through the inlet nozzles 22, the entering air being also caused by the partial vacuum to expand to the pressure of air in the first chamber 17, so that it has no tendency to spread out in said chamber, but passes directly and forcibly between the buckets 19, 20 and 21. The movement of the buckets 19 and 20 increases the velocity of the air, and discharges it into the compression nozzles 24, through which it passes to the first chamber 26.

It may be here stated that all that is required of the ejector 29 is to draw enough air out of the first chamber 17 to produce a vacuum of a few ounces at the commencement of the operation, and after that to hold the said vacuum against any leakage there may be around the shaft 12 and any air that may be spilled out of the buckets. The ejector may be regulated by any suitable means, to keep up a constant vacuum.

The partially compressed air in the first chamber 26 passes therefrom, through the nozzles 27, to the moving and fixed blades in the second chamber, where the action above described is repeated, the air being further compressed and passing to the next chamber 26, and from the latter, between the moving and fixed blades in the third chamber, to the chamber 26 communicating with the outlet passage, through which the air now under the desired compression passes. To insure the movement of the partially compressed air from the chambers 26, through the nozzles 27, a slight decrease in pressure is required between each chamber 26 and the compartment 17 containing the nozzle 27, into which air passes from the chamber 26.

The principle on which my improved compressor operates may be stated as follows: The air is given a high velocity by passing through a series of moving and stationary buckets 19, 20 and 21, and then still at its original pressure is discharged into the compression nozzles 24, where the movement of the air is decreased, the air losing most of its velocity and becoming correspondingly compressed. This is repeated successively in the different sections of the apparatus until the air reaches the desired pressure. It will be noted that each of the sections of the compressor consists of two distinct parts, one which includes the inlet nozzles and the buckets, giving the air the velocity corresponding to the pressure reached in that stage, and another, which includes the compression nozzles, causing the air to compress itself by giving up the greater part of its velocity.

My improved compressor, therefore, involves more than the reversal of the operation of a steam turbine, the compressor being distinguished from the steam turbine, first by the provision of means for drawing air into the apparatus, this provision being in the present case the ejector 29, although any other suitable means, such as an air pump may be substituted for the ejector, and secondly by means for retarding the air at the delivering side of the turbine, thus depriving it of its velocity, and causing a corresponding compression, the last mentioned provision as here shown being the chambers 26 and the nozzles 24 arranged as shown in Fig. 3, to conform to the angle at which the air passes from the turbine.

It is obvious that the invention may be embodied in one of the sections of the apparatus, instead of a series of sections arranged in tandem or series order.

To prevent leakage of air around the shaft 12, the heads 16 and the partitions 15 are preferably provided with suitable packings 35. In practice the buckets 19 and 20 are relatively thin blades attached at their inner ends to rings 36, affixed to the wheels or disks 18, the outer ends of the buckets being connected by rings 37, suitably attached to said outer ends. The fixed buckets 19 are attached at their outer ends to the corresponding parts of the casing, their inner ends being connected by rings 38.

The annular air chambers 26 which receive the compressed air from the turbines are preferably inclosed in jackets 39, through which water or other cooling medium may be circulated to absorb from the air the heat due to its compression.

The compressor embodying my invention has obvious advantages over the ordinary types of compressor, due to its compactness, simplicity, the absence of pistons and valves, and to the fact that with the exception of the bearings for the shaft 12, there are no rubbing surfaces under pressure. It is believed that higher efficiency can be obtained with my improved compressor than is possible in a piston compressor, because the compression in a compressor embodying my invention is divided into a number of stages, while the ordinary compressor has at most only three cylinders, and more often only one or two. The jacketed annular chambers 26 which receive the compressed air can be cooled during compression more advantageously than in a compressor having a large cylinder, where only a small part of the compressed air is subjected to the heat-absorbing influence of the cooled walls of the cylinder. The temperature and pressure at any point in my improved compressor is constant, while in a piston compressor, each charge of air is drawn into a cylinder which retains the heat from the last compressed charge.

I claim:

1. An air compressor comprising a turbine, a casing surrounding the same, said casing having air inlet means at one side of the turbine and air outlet means at the other side thereof, and means independent of the turbine for exhausting the air from said casing at a point adjacent said inlet to increase the velocity of the air entering said inlet.

2. An air compressor comprising a turbine, a casing surrounding the same, said casing having air inlet means at one side of the turbine and air outlet means at the other side thereof, and means operated by the compressed air from said outlet for exhausting air from said casing at a point adjacent said inlet to increase the velocity of air entering said inlet.

3. An air compressor comprising a turbine, a casing surrounding the same, said casing having air inlet means at one side of the turbine and air outlet means at the other side thereof, and an air injector for exhausting air from said casing at a point adjacent said inlet to increase the velocity of air entering the air inlet.

4. An air compressor comprising a series of sections or stages, each including a chamber or casing, a turbine inclosed therein, and having alternating revolving and fixed blades, a plurality of air inlets at one side of each casing, and a plurality of air outlets at the opposite side of each casing, the inlets of each section after the first, receiving air from the outlets of the preceding section, and means for increasing the velocity of air passing through the inlets of the first section.

In testimony whereof I have affixed my signature, in presence of two witnesses.

F. W. GARDNER.

Witnesses:
C. F. BROWN,
E. BATCHELDER.